United States Patent
Liao (10) Patent No.: US 8,714,813 B2
(45) Date of Patent: May 6, 2014

(54) WATCH WINDER HAVING WIRELESS ENERGY TRANSFERRING FUNCTION

(75) Inventor: Been-Tzaw Liao, Taichung (TW)

(73) Assignee: Gooten Innolife Corporation, Taichung (TW)

( * ) Notice: Subject to any disclaimer, the term of this patent is extended or adjusted under 35 U.S.C. 154(b) by 433 days.

(21) Appl. No.: 13/241,113

(22) Filed: Sep. 22, 2011

(65) Prior Publication Data

US 2012/0082011 A1 Apr. 5, 2012

(30) Foreign Application Priority Data

Oct. 4, 2010 (TW) .............................. 99219148 U (51) Int. Cl.
| | | |
|---|---|---|
| G04B 5/00 | (2006.01) | |
| G04D 1/04 | (2006.01) | |
| H02J 7/00 | (2006.01) | |
| G04D 7/00 | (2006.01) | |
| H02J 7/02 | (2006.01) | |

(52) U.S. Cl.
CPC *G04D 7/009* (2013.01); *G04B 5/00* (2013.01); *H02J 7/025* (2013.01)
USPC .............................. 368/206; 81/7.5; 320/108

(58) Field of Classification Search
CPC ................. H02J 7/025; G04D 7/009
USPC ..................... 368/204, 206–208, 218; 81/7.5; 307/104; 320/103, 108, 137
See application file for complete search history.

(56) References Cited

U.S. PATENT DOCUMENTS

| | | | |
|---|---|---|---|
| 4,873,677 A * | 10/1989 | Sakamoto et al. ............ | 368/204 |
| 7,211,986 B1 * | 5/2007 | Flowerdew et al. .......... | 320/108 |
| 7,751,285 B1 * | 7/2010 | Cain ............................... | 368/82 |
| 2006/0028922 A1 * | 2/2006 | Wolf .............................. | 368/316 |
| 2008/0116847 A1 * | 5/2008 | Loke et al. .................... | 320/108 |
| 2009/0010462 A1 * | 1/2009 | Ekchian et al. ............... | 381/312 |
| 2009/0322285 A1 * | 12/2009 | Hautanen ...................... | 320/137 |
| 2010/0165798 A1 * | 7/2010 | Huang .......................... | 368/206 |
| 2010/0289341 A1 * | 11/2010 | Ozaki et al. ................... | 307/104 |
| 2011/0164471 A1 * | 7/2011 | Baarman et al. ............... | 368/10 |
| 2011/0176395 A1 * | 7/2011 | Mooring ....................... | 368/276 |

FOREIGN PATENT DOCUMENTS

TW M355593 5/2009

* cited by examiner

*Primary Examiner* — Vit W Miska
(74) *Attorney, Agent, or Firm* — Browdy and Neimark, PLLC (57) ABSTRACT

A watch winder includes a housing, a power supply disposed in the housing, a transmitter coil mounted at one side of the housing and electrically connected with a circuit board of the power supply, and a receiver coil mounted at another side of the housing and electrically connected with a circuit board of the power supply. The fist coil can be actuated by the power supply to transmit a signal, and the receiver coil can be used to receive a signal and convert the signal into an electrical current that can be transmitted to the circuit board for charging the power supply. Therefore, the electrical energy of the watch winder can be wireless transmitted through a non-contact interface.

7 Claims, 8 Drawing Sheets

WATCH WINDER HAVING WIRELESS ENERGY TRANSFERRING FUNCTION

BACKGROUND OF THE INVENTION

1. Field of the Invention

The present invention relates generally to a watch winder, and more specifically to a watch winder that has a non-contact interface for the transmission of electrical energy.

2. Description of the Related Art

A mechanical watch can be a manually winding type, whose mainspring must be wound by turning manually a small knob on the case of the watch to provide energy to run the watch, or an automatically winding type, whose mainspring is wound automatically by the natural motion of the wearer's arm. Watch winders are mechanical devices that can simulate the aforesaid natural motion to keep the so-called "automatic watch" or "self-winding watch" that is stored in the watch winder operating smoothly for those who don't wear their watch everyday and/or won't wear their watch for a long time.

Taiwan Patent No. M355593 disclosed a watch winder assembly, including a plurality of watch winders. When the watch winders are assembled, the two adjacent watch winders need to be in contact with each other through their conducting portions for electrical conduction, such that all of the watch winders can be actuated while a power supply is electrically connected with one of the watch winders. However, since the two adjacent watch winders are electrically conducted to each other through the contact interface, a poor contact, which is possibly caused by an external force, between the two adjacent watch winders may affect the normal operation of the watch winder assembly.

SUMMARY OF THE INVENTION

The present invention has been accomplished in view of the above-noted circumstances. It is therefore one objective of the present invention to provide a watch winder, which has a non-contact interface for transmission of electrical energy, such that a plurality watch winder of the present invention can be assembled in a modularized manner without material connection for transmission of electrical energy.

To achieve this objective of the present invention, the watch winder comprises a housing having a chamber therein, a rotating unit disposed in the chamber of the housing, and having a motor and a rotating bracket connected with the motor for holding a watch, a power supply disposed in the chamber of the housing and having a circuit board electrically connected with the motor, and a non-contact inducing charger having a transmitter coil mounted at one side of the housing and electrically connected with the circuit board such that the transmitter coil can be actuated by the power supply to transmit a signal, and a receiver coil mounted at another side of the housing and electrically connected with the circuit board, such that the receiver coil can receive a signal and convert the signal into an electric current that can be transmitted to the circuit board for charging the power supply. Accordingly, the watch winder can utilize a non-contact interface to avoid poor contact in electrical power transmission.

Preferably, the number of the transmitter coil is two and the number of the receiver coil is two; and further, the two transmitter coils can be placed on the two adjacent sides of the housing, and the two receiver coils can be placed on the two another sides of the housing.

Further scope of applicability of the present invention will become apparent from the detailed description given hereinafter.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
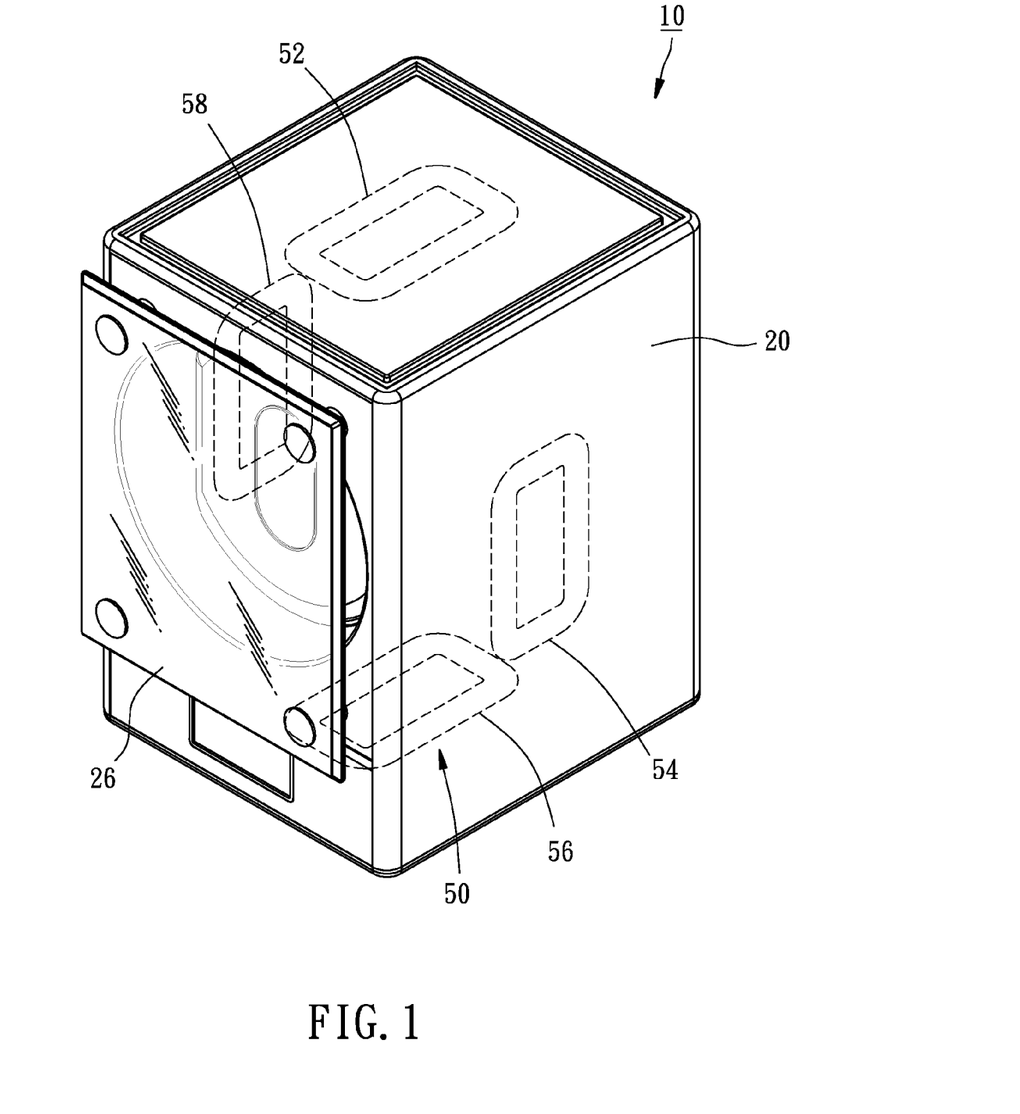
FIG. 1 is a perspective view of the watch winder according to an embodiment of the present invention.
Figure 2:
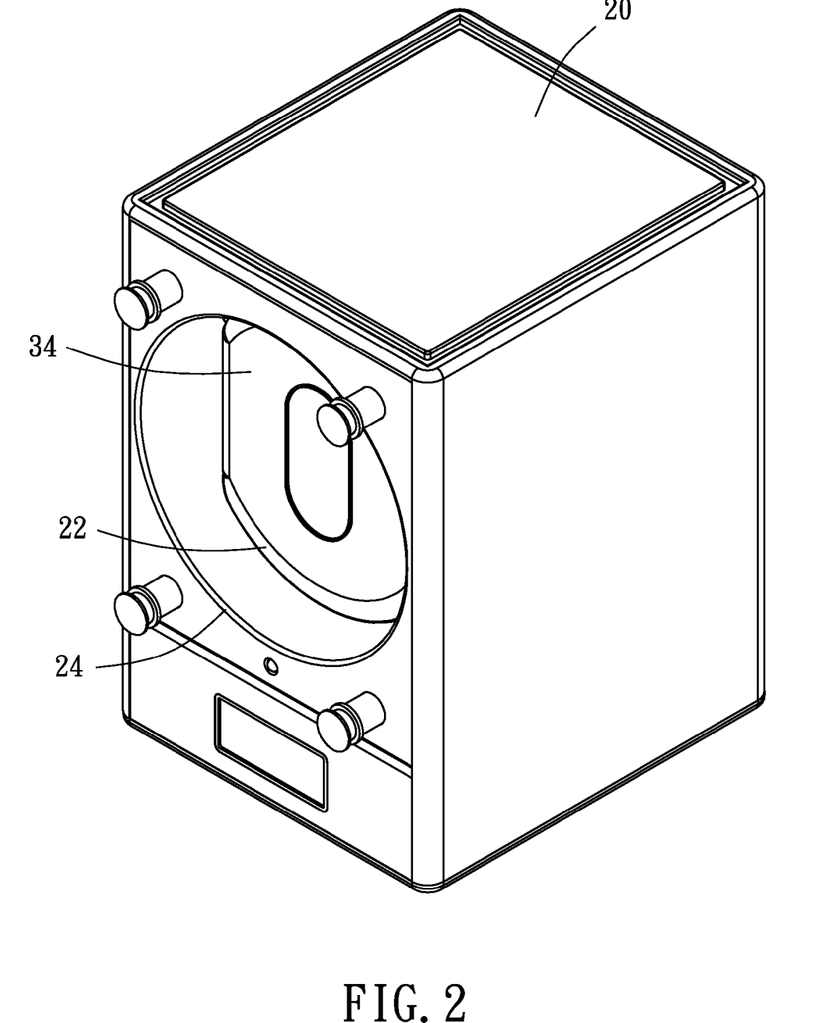
FIG. 2 is similar to FIG. 1, but showing the transparent plate is removed.
Figure 3:
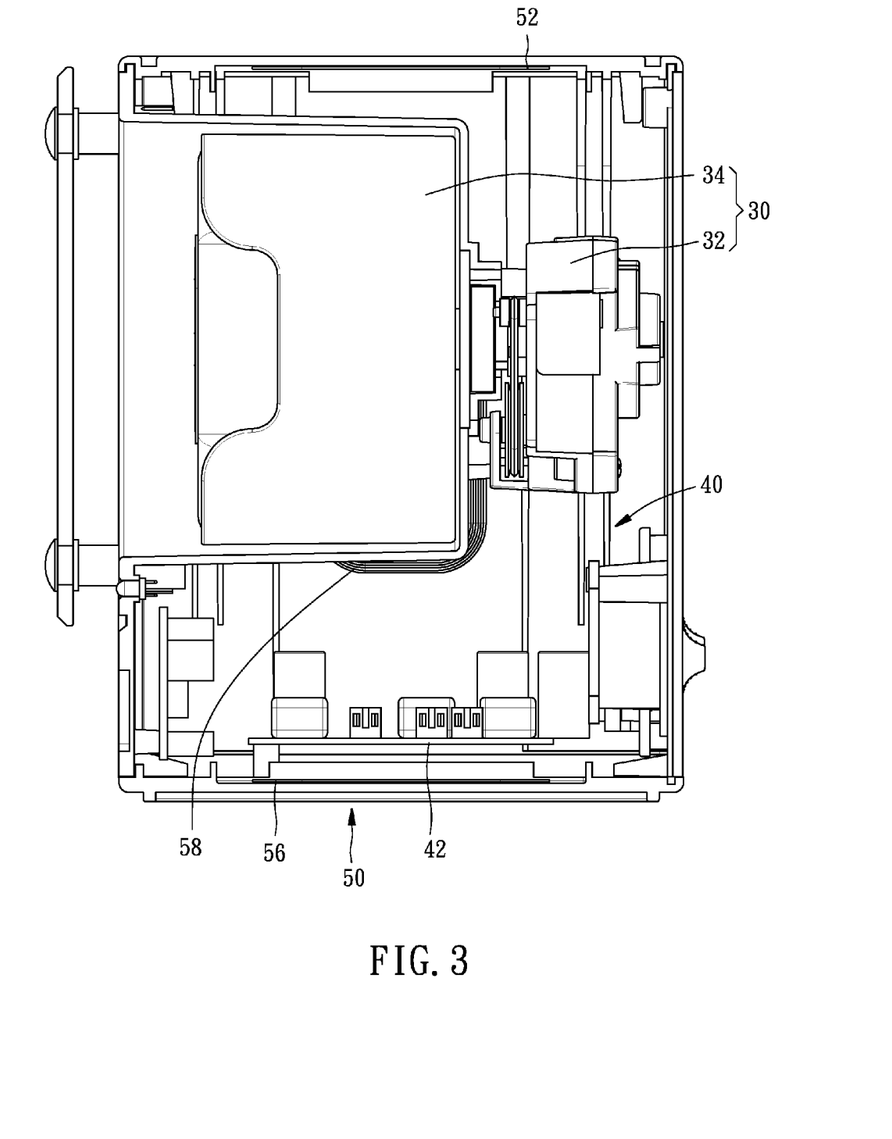
FIG. 3 is a right side view of the watch winder according to the embodiment of the present invention, in which the right plate of the housing is removed.

As shown in FIGS. 1-3, a watch winder 10 in accordance with a preferred embodiment of the present invention comprises a housing 20, a rotating unit 30, a power supply 40, and a non-contact inducing charger 50.

The housing 20 is a rectangular body, having a chamber 22 therein and an opening 24 at a front side thereof, which is in communication with the chamber 22 and the outside of the housing 20. A transparent plate 26 is attached to the front side of the housing 20 to cover the opening 24 of the housing 20.

The rotating unit 30 is disposed in the chamber 22 of the housing 20, including a motor 32 and a rotating bracket 34 connected with the motor 32 and drivable by the motor 32 to rotate. A watch can be held by the rotating bracket 34 through the opening 22, such that the mainspring of the watch can be wound automatically by the rotation of the rotating bracket 34, and furthermore the watch can be seen easily through the transparent plate 26 and also be protected by the transparent plate 26.

The power supply 40 is disposed in the bottom of the housing 20 and provided with a circuit board 42 electrically connected with the motor 32, such that the motor 32 can be actuated by the power supply 40 through the circuit board 42 when the power supply 40 is electrically connected with an external power source.

Figure 4:
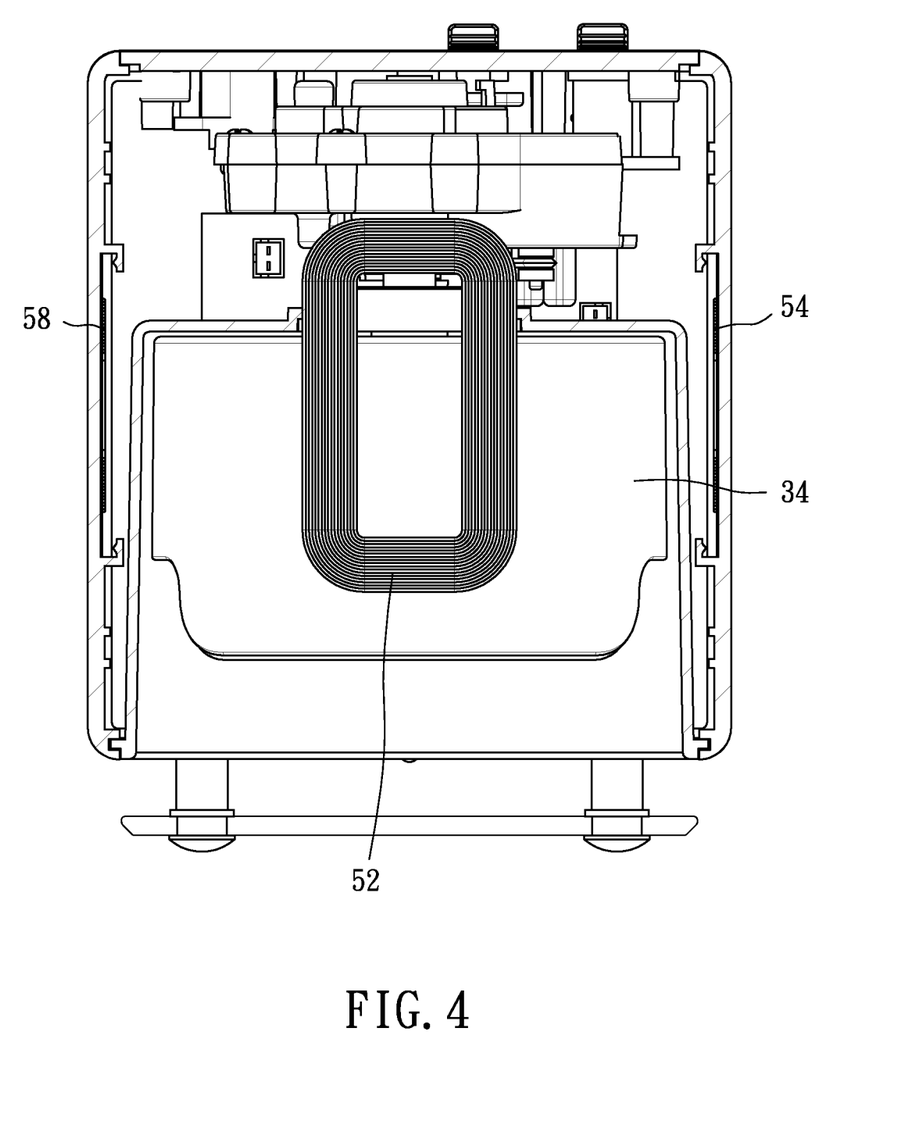
FIG. 4 is a top view of the watch winder according to the embodiment of the present invention, in which the top plate of the housing is removed.

As shown in FIGS. 1, 3, and 4, the non-contact inducing charger 50 has two transmitter coils 52 and 54, and two receiver coils 56 and 58. The transmitter coils 52 and 54 are respectively mounted at the top and right sides of the housing 20 and electrically connected with the circuit board 42, such that the transmitter coils 52 and 54 can be actuated by the power supply 40 to transmit a wireless signal. Further, the receiver coils 56 and 58 are respectively mounted at the bottom and left sides of the housing 20 and electrically connected with the circuit board 42 for receiving a wireless signal and further converting the received signal into an electric current to be transmitted to the circuit board 42 for charging the power supply 40. To deserve to be mentioned, in this preferred embodiment the transmitter coils 52 and 54 are served as transmitters and the receiver coils 56 and 58 are served as receivers; however, the transmitter coils 52 and 54 can be controlled by a switch to act as receiver for receiving and converting a wireless signal, and the receiver coils 56 and 58 can also be controlled by the switch to act as a transmitter for transmitting a wireless signal.

The structure of the watch winder 10 of the present invention is described as above, and various modularized assemblies, each of which is constructed by four watch winders 10a-10d of the present invention, are recited hereinafter.

Figure 5:
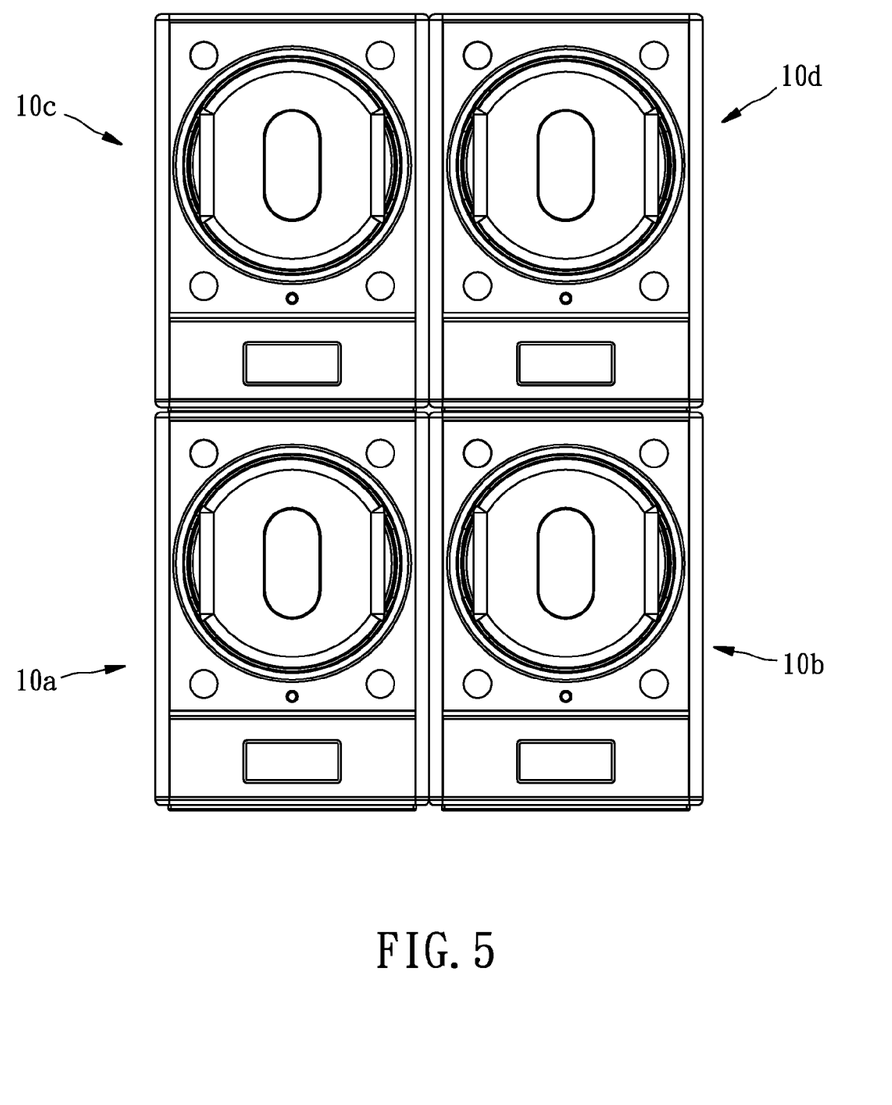
FIGS. 5-8 are front views of various modularized assemblies of the watch winders according to the embodiment of the present invention.

As shown in FIG. 5, the watch winder 10a is electrically connected with the external power source (not shown in the drawing) for enabling the transmitter coils 52 and 54 to transmit the wireless signals, and then the watch winder 10b and 10c are placed on the right and top sides of the watch winder 10a and the watch wider 10d is placed on the top side of the watch winder 10b and laterally abutted with the watch winder 10c, such that the receiver coil 58 of the watch winder 10b and the receiver coil 56 of the watch winder 10c can respectively receive the signals transmitted from the transmitter coils 52 and 54 of the watch winder 10a, and convert the received signals into electric energy for charging the power supplies 40 of the watch winders 10b and 10c. Therefore, the transmitter coil 52 of the watch winder 10b and the transmitter coil 54 of the watch winder 10c can be actuated to transmit wireless signals without using the external power source, such that the receiver coils 56 and 58 of the watch winder 10d can receive the signals transmitted from the transmitter coil 52 of the watch winder 10b and the transmitter coil 54 of the watch winder 10c. As a result, the electric energy converted by the receiver coils 56 and 58 of the watch winder 10d is supplied to the power supply 40 of the watch winder 10d, allowing the watch winder 10d to be operated without using the external power source.

Figure 6:
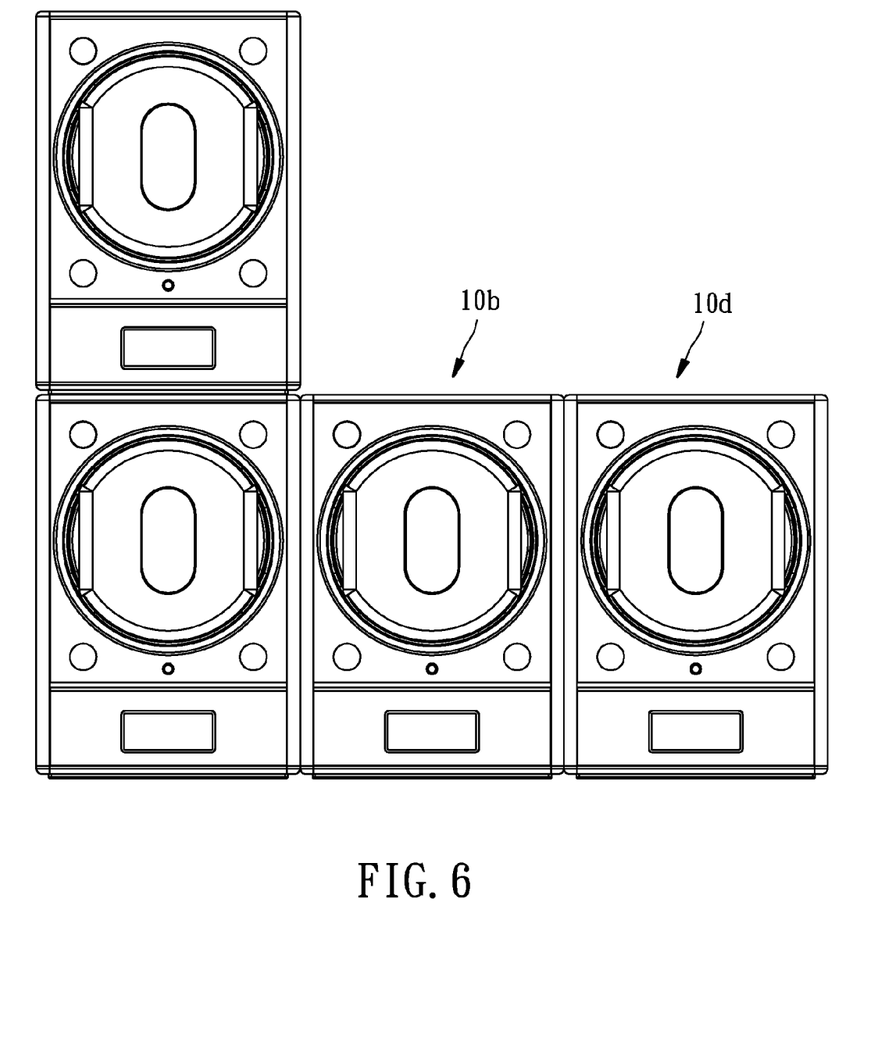

As shown in FIG. 6, the second modularized assembly is similar to the first modularized assembly of FIG. 5, except that the watch winder 10d is placed on the right side of the watch winder 10b to allow the receiver coil 58 of the watch winder 10c to receive the signal transmitted from the transmitter coil 54 of the watch winder 10b.

Figure 7:
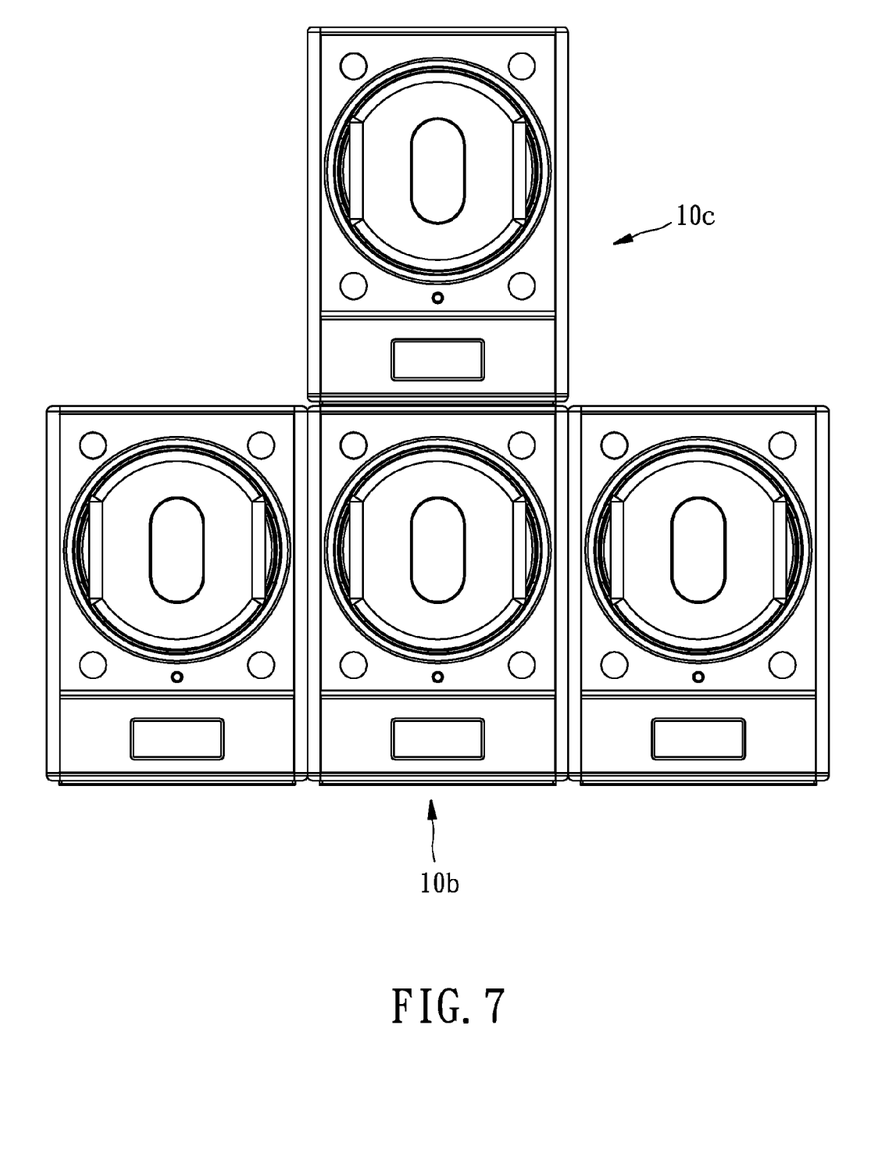

As shown in FIG. 7, the third modularized assembly is similar to the second one of FIG. 6, except that the watch winder 10c is placed on the top side of the watch winder 10b to enable the receiver coil 56 of the watch winder 10c to receive the signal transmitted from the transmitter coil 52 of the watch winder 10b.

Figure 8:
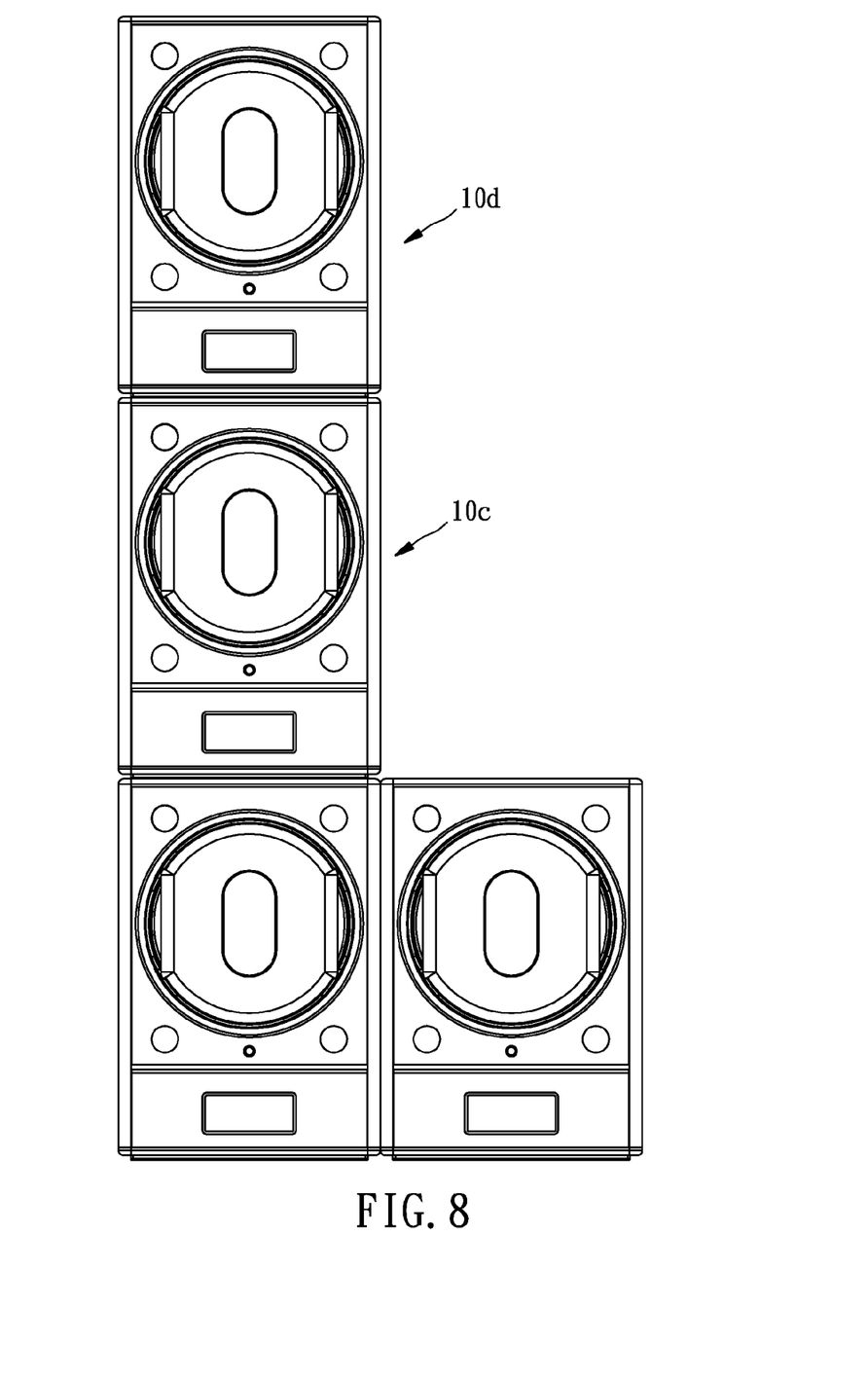

As shown in FIG. 8, the forth modularized assembly illustrates that the watch winder 10d is placed on the top side of the watch winder 10c to enable the receiver coil 56 of the watch winder 10d to receive the signal transmitted from the transmitter coil 52 of the watch winder 10c.

In view of the above-mentioned modularized assemblies, no matter what configuration of the modular assembly is constructed, a non-contact interface is created between the transmitter coil of a watch winder and the receiver coil of an adjacent watch winder to avoid poor contact between the two adjacent watch winders, thereby ensuring the normal operation of the watch winders. Further, the aforesaid examples illustrate various modularized assemblies of the watch winders; in fact, the number and the position of the watch winders are adjustable according to actual needs.

What is claimed is:

1. A watch winder comprising:
    a housing having a chamber therein;
    a rotating unit disposed in the chamber of the housing, and having a motor and a rotating bracket connected with the motor;
    a power supply disposed in the chamber of the housing and having a circuit board electrically connected with the motor; and
    a non-contact inducing charger having at least one transmitter coil mounted at one side of the housing and electrically connected with the circuit board for transmitting a signal, and at least one receiver coil mounted at another side of the housing and electrically connected with the circuit board for receiving a signal and converting the signal into an electric current transmitted to the circuit board.

2. The watch winder as claimed in claim 1, wherein the non-contact inducing charger comprises two said transmitter coils selectively mounted at two sides of the housing.

3. The watch winder as claimed in claim 2, wherein the two transmitter coils are mounted at two adjacent sides of the housing.

4. The watch winder as claimed in claim 1, wherein the non-contact inducing charger comprises two said receiver coils selectively mounted at two sides of the housing.

5. The watch winder as claimed in claim 4, wherein the two receiver coils are mounted at two adjacent sides of the housing.

6. The watch winder as claimed in claim 1, wherein a transparent plate is attached to the housing to cover an opening in communication with the chamber and an outside of the housing.

7. The watch winder as claimed in claim 1, wherein the transmitter coil is switchable to act as a receiver and the receiver coil is switchable to act as a transmitter by a switch.

* * * * *